United States Patent [19]

Ohmura

[11] 4,174,583
[45] Nov. 20, 1979

[54] LINE GUIDE ASSEMBLY FOR FISHING RODS

[75] Inventor: Ryuichi Ohmura, Shizuoka, Japan

[73] Assignee: Fuji Kogyo Co., Ltd., Japan

[21] Appl. No.: 839,415

[22] Filed: Oct. 5, 1977

[51] Int. Cl.$^2$ ............................................ A01K 87/04
[52] U.S. Cl. ...................................................... 43/24
[58] Field of Search ................. 43/24, 21.2; 242/157 R

[56] References Cited

U.S. PATENT DOCUMENTS 3,402,500   9/1968   Nelson ..................................... 43/24

FOREIGN PATENT DOCUMENTS 326344   3/1930   United Kingdom ......................... 43/24
974687  11/1964   United Kingdom ......................... 43/24

Primary Examiner—Jimmy C. Peters
Attorney, Agent, or Firm—Holman & Stern

[57] ABSTRACT

In a line guide assembly for fishing rods, a line guide ring made of an extremely hard material such as ceramics is suspensorily upheld within a fixing ring made of an elastic metallic material such as stainless steel while leaving a plurality of separate gaps between the two rings which function as a shock absorber and omission of the conventionally use intermediate cushion ring successfully minimizes the entire size and weight of the line guide assembly while allowing easy and smooth passage of fishing lines.

6 Claims, 7 Drawing Figures

LINE GUIDE ASSEMBLY FOR FISHING RODS

BACKGROUND OF THE INVENTION

The present invention relates to an improved line guide assembly for fishing rods, and more particularly relates to an improved construction of a line guide assembly used for passing fishing lines on fishing rods.

The conventional line guide assembly for fishing rods is in general made up of an innermost line guide ring made of an extremely hard material such as ceramics, an intermediate cushion ring inserted over the innermost line guide ring and made of an elastic material such as plastics, and an outermost fixing ring forcibly inserted over the intermediate cushion ring and made of a metallic material. With this conventional construction of the line guide assembly, use of the intermediate cushion ring is indispensable on one hand in order to absorb shocks accidentally imposed upon the outermost fixing ring and dimensional variance in the construction of the line guide assembly. However, on the other hand, use of the intermediate cushion ring inevitably connect to enlarged construction and increased weight of the line guide assembly which hinder smooth handling of the fishing rod to which the line guide assembly.

SUMMARY OF THE INVENTION

The primary object of the present invention is to provide a line guide assembly for fishing rods which is very compact in its construction.

Another object of the present invention is to provide a line guide assembly of considerably reduced weight.

In accordance with the basic concept of the present invention, a line guide ring is suspensorily upheld in a fixing ring, the line guide ring is made of an extremely hard material such as ceramics and the fixing ring is made of an elastic metallic material such as stainless steel. In accordance with the present invention, the suspensory mechanism is provided by a plusility of projections formed on the internal periphery of the fixing ring and in contact with the outer periphery of the line guide ring.

DESCRIPTION OF THE PREFERRED EMBODIMENTS

Figure 1:
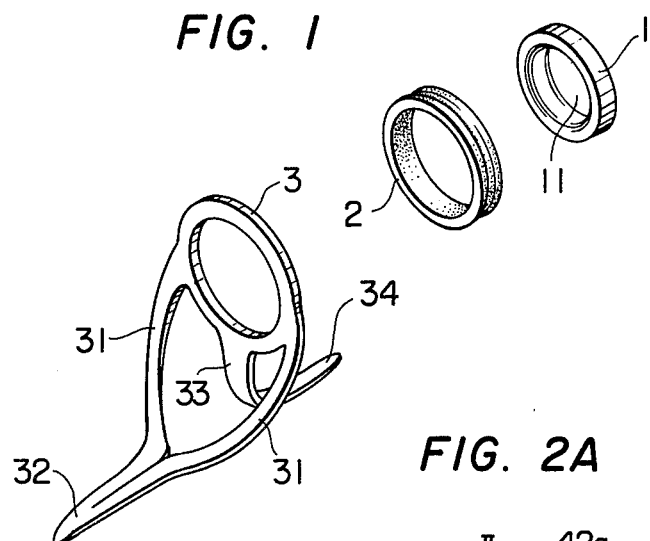
FIG. 1 is a perspective view of an example of the conventional line guide assembly in a disassembled state.

A typical example of the conventional line guide assembly for fishing rods is shown in FIG. 1 in a disassembled state, in which the line guide assembly includes an innermost line guide ring 1, an intermediate cushion ring 2 and an outermost fixing ring 3. The line guide ring 1 is provided with an axial circular through hole 11 adapted for passing fishing lines and is made of an extremely hard material. The cushion ring 2 is made of a relatively soft elastic material. The fixing ring 3 is made of a metallic material, and provided with a pair of side arms 31 merging into a common seat 32 and another arm 33 the free end of which forms another seat 34. In use of the line guide assembly, same is mounted on a fishing rod and fixed thereto by suitable wires or strings binding the seats 32 and 34 to the body of the fishing rod.

With the above-described construction of the conventional line guide assembly for fishing rods, presence of the intermediate cushion ring 2 between the innermost guide ring 1 and the outermost fixing ring 3 results in increased weight of the entire line guide assembly and relatively small effective internal diameter of the assembly adapted for passing fishing lines despite of its relatively large outer diameter. The increased weight of the line guide assembly hinders smooth handling of the fishing rod for which such a line guide assembly is used. The relatively large outer diameter of the line guide assembly connects to increased pneumatic resistance when the fishing rod is swung in use. The small diameter of the line guide assembly forms a bar to smooth running of fishing lines through the line guide ring.

The above-described troubles caused by the constructional feature of the conventional line guide assembly may successfully be avoided by omitting the cushion ring 2 between the innermost line guide ring 1 and the outermost fixing ring 3. In this case, the line guide ring 1 is directly coupled to the fixing ring 3. During actual use of the fishing rod, there often are cases that the line guide assembly mounted on the fishing rod unintentionally hit against something very hard such as rocks and direct transmission of shock caused thereby to the line guide ring 1 from the fixing ring 3 connects to undesirable damage of the line guide ring 1. Thus, the intermediate cushion ring 2 is an indispensable element in the construction of the line guide assembly which functions as a shock absorber. In addition, the intermediate cushion ring functions as an element for absorbing dimensional variance in the coupling of the line guide ring 1 with the fixing ring 3. From this point of view also, the intermediate cushion ring is an indispensable element in the construction of the conventional line guide assembly for fishing rods.

Figures 2A, 2B:
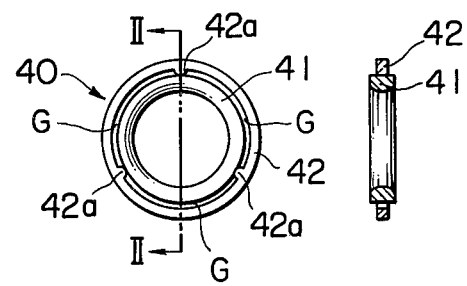
FIG. 2A is a transverse cross sectional view of the main part of one embodiment of the line guide assembly in accordance with the present invention.
FIG. 2B is a section taken along the line II—II in FIG. 2A.

A basic embodiment of the line guide assembly for fishing rods in accordance with the present invention is shown in FIG. 2, in which the line guide assembly 40 includes an inner line guide ring 41 and an outer fixing ring 42. The construction of the line guide ring 41 is almost similar to that of the conventional one and is made of an extremely hard material such as ceramics. The fixing ring 42 is made of a highly elastic metallic material such as stainless steel and is provided on its inner periphery with three diametrical projections 42a. Dimension of the line guide assembly 40 should be so chosen that the inner diameter of the fixing ring 42 is somewhat larger than the outer diameter of the line guide ring 41 and that the diameter of the inscribed circle of the fixing ring 42 having the diametrical projections 42a is somewhat smaller than the outer diameter of the line guide ring 41. For coupling of the two rings, the line guide ring 41 is forcibly inserted into the fixing ring 42 by suitable mechanical pressing, thereby the outer fixing ring 42 being forced to deform. After coupling is complete, the outer fixing ring 42 tends to resume its original intact shape due to its elastic nature to strongly uphold the inner line guide ring 41 in position by radial pressure exerted through the projections 42a. In this coupled state, the inner line guide ring 41 is suspensorily upheld within the outer fixing ring 42 via three points of contact only. Over the most portions other than the three points, the two rings 41 and 42 are not in contact with each other while leaving gaps G. Due to presence of these gaps G, direct transmission accidentally imposed on the outer fixing ring 42 to the inner line guide ring 41 is considerably mitigated and, thus, the outer fixing ring 42 functions as a kind of protector for the inner line guide ring 41.

In the above-described embodiment, the line guide assembly is further provided with elements for mounting same to fishing rods such as the arms and seats of the conventional line guide assembly shown in FIG. 1.

As is well understood, omission of the conventionally use cushion ring in accordance with the present invention sucessfully results in the reduced outermost diameter of the fixing ring, i.e. minimization in construction of the line guide assembly, and reduced weight of the line guide assembly.

Figure 3:
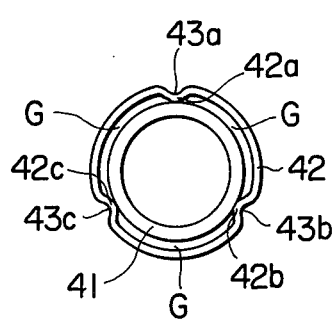
FIG. 3 is a transverse cross sectional view of the other embodiment of the line guide assembly in accordance with the present invention.

Further reduced weight of the line guide assembly is resulted from the construction of the embodiment shown in FIG. 3, in which the fixing ring 42 has a uniform thickness, i.e. the diametrical dimension, over the entire periphery thereof. That is, the fixing ring 42 is provided with three recesses 43a to 43c in the outer surface thereof at positions corresponding to the inner diametrical projections 42a to 42c for suspensorily upholding the inner line guide ring 41. Thus, the line guide assembly is provided with three gaps G left between the two rings 41 and 42. Like the preceding embodiment, the projections 42a to 42c are spaced from each other at substantially equal intervals along the periphery of the fixing ring 42.

Figures 4A, 4B:
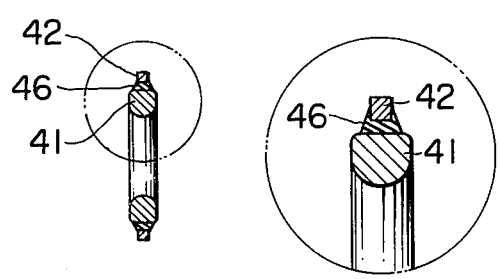
FIGS. 4A, 4B, and 4C are side sectional views of a further embodiment of the present invention.
Figure 4C:
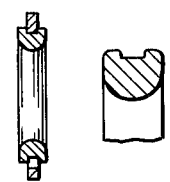

As shown in FIG. 4A, more clearly in FIG. 4B, the gaps between the two rings 41 and 42 may advantageously be filled with a suitable bonding agent, thereby well consolidating the coupling of the two rings.

In accordance with the other aspect of the present invention, the line guide ring 41 may be provided with a rough ended outer peripheral surface to increase abrasional resistance of same. The increased abrasional resistance of the surface very effectively restrains undersirable slippage which may otherwise occur between the two rings 41 and 42 at the points of contact. It is also recommended to form a recess or recesses in the outer periphery of the line guide ring 41 in order to immovably receive the projection or projections of the fixing ring 42. Elastic rings may advantageously inserted in such recesses. The two rings 41 and 42 may be bonded to each other by a suitable adhesive at their points of contact.

I claim:

1. An improved line guide assembly for fishing rods comprising:
   a fixing ring of elastic material having an outer periphery and an inner periphery;
   a guide ring within said fixing ring, said guide ring having an outer periphery of smaller diameter than said inner periphery of said fixing ring; and
   circumferentially spaced elements between said outer periphery of said guide rings and said inner periphery of said fixing ring, said elements applying radial pressure between the rings to hold the rings in an assembled condition.

2. An improved guide assembly as claimed in claim 1, wherein said elements comprise projections formed on the inner periphery of said fixing ring.

3. An improved line guide assembly as claimed in claim 2 in which said projections are spaced from each other at substantially equal intervals along the inner periphery of said fixing ring.

4. An improved line guide assembly as claimed in claim 2 in which said line guide ring is provided with a roughened outer surface.

5. An improved line guide assembly as claimed in claim 1 in which said two rings are bonded to each other by a suitable adhesive filled in gaps left between the two.

6. An improved line guide assembly as claimed in claim 1 in which a groove is provided in the outer periphery of the said line guide ring, and a diametral projection of the fixing ring is inserted in said groove.

* * * * *